United States Patent [19]

Boles et al.

[11] Patent Number: 4,639,606
[45] Date of Patent: Jan. 27, 1987

[54] BAR CODE SCANNER LASER RADIATION EXPOSURE LIMIT CONTROL SYSTEM

[75] Inventors: John A. Boles, Fishers; Jay M. Eastman, Pittsford, both of N.Y.

[73] Assignee: Optel System Limited, Rochester, N.Y.

[21] Appl. No.: 665,276

[22] Filed: Oct. 26, 1984

[51] Int. Cl.⁴ ............................................. G06K 7/10
[52] U.S. Cl. ................................... 250/555; 235/455; 235/462
[58] Field of Search ............... 250/555, 566, 567, 568; 355/69; 235/455, 462, 466, 470, 472

[56] References Cited

U.S. PATENT DOCUMENTS

| | | | |
|---|---|---|---|
| 3,806,762 | 4/1974 | Punis et al. | 315/307 |
| 3,995,166 | 11/1976 | Hobart et al. | 250/566 |
| 4,006,343 | 2/1977 | Izura et al. | 235/61.11 E |
| 4,007,377 | 2/1977 | Simon et al. | 250/566 |
| 4,034,230 | 7/1977 | Brill et al. | 250/568 |
| 4,122,409 | 10/1978 | Marlett et al. | 331/945 M |
| 4,180,784 | 12/1979 | Nelson et al. | 331/94.5 PE |
| 4,240,064 | 12/1980 | Dev Choudhury | 235/455 |
| 4,397,552 | 8/1983 | Silberberg | 356/215 |
| 4,431,912 | 2/1984 | Dickson et al. | 235/466 |
| 4,479,050 | 10/1984 | Helffrich | 235/466 |
| 4,567,360 | 1/1986 | Yamada | 235/472 |

Primary Examiner—David C. Nelms
Attorney, Agent, or Firm—Martin Lukacher

[57] ABSTRACT

In order to meet the requirements for laser radiation safety, namely laser output which can enter the naked human eye indefinitely and cause no discernible damage (Class I emission limit) in a code symbol (bar code) scanner, a mode controller is used for generating a laser enabling the signal so as to turn the laser on in a search mode until the symbols are acquired and in an in-code mode while the symbols are being scanned. When the laser is turned on it operates at a power output which would exceed the Class I emission limits if operated continuously. Circuitry is provided for operating the mode controller so that the laser is not enabled to turn on for a period long enough to exceed Class I limits. Such circuitry may be an integrator or accumulator which responds to the time that the mode controller turns the laser on and which provides an output for inhibiting the mode controller from turning the laser on for a period of time sufficient to prevent the Class I emission limit from being exceeded. The circuitry may alternatively be a pulse generator which permits the mode controller to turn the laser on repetitively during a "find paper" mode with a duty cycle such that the Class I emission limits are not exceeded.

9 Claims, 5 Drawing Figures

STATE TRANSITION CONDITION
- A    NO RETURN SIGNAL
- B    RETURN SIGNAL
- C    ONE SECOND ELAPSED AND NO FIRST BLACK BAR
- D    NO FIRST BLACK BAR & ONE SECOND TIMER STILL ON
- E    DETECT FIRST BLACK BAR
- F    INTERVAL > 40 msec & ONE SECOND NOT ELAPSED
- G    INTERVAL BETWEEN BARS < 40 msec
- H    INTERVAL BETWEEN BARS > 40 msec & ONE SECOND TIMER ELAPSED

BAR CODE SCANNER LASER RADIATION EXPOSURE LIMIT CONTROL SYSTEM

DESCRIPTION

The present invention relates to code symbol scanner apparatus, such as bar code scanners which read universal product code symbols, and particularly to code symbol scanners having lasers which generate the beam which is scanned over the code symbols and which are operated so as not to exceed laser emission safety limits.

Laser equipment must be designed to protect the user against injury, particularly exposure of the human eye to laser radiation. In the U.S., laser equipment must be designed to meet the safety standards of the Food and Drug Administration contained in Part 1040 of Title 21 of the Code of Federal Regulations. Special protective housings, interlocks and alarm indicators are required, unless the output of the laser can enter the human eye indefinitely and cause no discernible damage. A laser which provides such an output is classified as a Class I laser. Code symbol, such as bar code, scanners must provide output radiation intensities exceeding Class I limits, if they are operated continuously, in order to detect the bar code symbols in their operating environments, because of the noise levels involved.

Various techniques have been proposed for limiting the laser emissions in bar code scanners in order to approach the safety limits. However, practical laser scanners meeting the Class I limits have not been commercially available. The limits are subject to test and inspection by the governmental authorities who have instruments for the purpose. U.S. Pat. No. 4,397,552 issued Aug. 9, 1983, describes one such instrument. Of the techniques which have been proposed, some involve limitation of the emitted power by repeatedly changing the angle or aperture of the laser beam, since the regulations define the power which is received over a target area (see U.S. Pat. No. 3,995,166 issued Nov. 30, 1976). Another technique which has been proposed is to avoid the use of a laser, and instead use an incandescent lamp as the source of the scanning beam (see U.S. Pat. No. 4,034,230, issued July 5, 1977). In scanners used in stationary installations, such as within a point of sale terminal at a checkout counter, photodetectors on the counter have been used to open shutters in the laser beam path, when the product passes over the laser window on the counter (see U.S. Pat. No. 4,006,343, issued Feb. 1, 1977). In such checkout counter scanners, it has also been proposed to operate the shutter in response to the detection of the code symbols thereby eliminating the need for a photodetector which senses when the product has passed the window (see U.S. Pat. No. 4,431,912, issued Feb. 14, 1984). Such shutter controllers do not provide an absolute safeguard by turning the laser itself off for a sufficient period of time during scanning to assure that the Class I emission limits are not exceeded. Still another technique which has been proposed is to control the scanning pattern and the rate of scan (see U.S. Pat. No. 4,007,377 issued Feb. 8, 1977).

It is the principal object of the present invention to provide code symbol scanner apparatus in which the time in which the laser is off, as compared to the time that the laser is on, is sufficiently long to meet laser radiation safety limits even though the laser intensity is of such a magnitude as to exceed the limits, would the laser be on continuously.

It is a further object of the present invention to provide improved code symbol scanner apparatus utilizing a diode laser having an output level which would exceed Class I emission limits if operated continuously, which nevertheless meets such limits thereby avoiding the need for protective housings, interlocks, warning devices and even warning labels.

It is a still further object of the present invention to provide an improved code symbol scanner which operates in a "find paper" mode for triggerless operation which stays below the Class I safety limit.

Briefly described, code symbol scanner apparatus embodying the invention utilizes a laser normally operable at a power output above radiation safety limits and photodetector means for deriving signals from the code symbols. The apparatus makes use of mode control means for providing a "search" mode of operation and an "in-code" mode of operation. The in-code mode is initiated upon detection of the first symbol and discontinued unless successive symbols are received by the photodetector means within a given period of time. The laser is operated during the search and in-code modes above the safety limit. The mode controller effects such operation by generating a laser enabling signal. This signal may enable operating voltage to be applied to a laser diode which generates the scanning beam. Means are provided for controlling the mode control means to control the time the laser is turned on so that the radiation safety limits are not exceeded. The latter circuitry may be implemented by a dual-slope integrator or accumulator which generates a signal which increases when the laser is on and decreases when the laser is off. When the signal increases over a limit representing that the laser has been on for a time during any running period of time during which the emission limits are approached but not exceeded, a signal is generated inhibiting the mode control means from initiating either the search or the in-code mode for a given period of time or "off time". The interposition of the off time insures that Class I laser emission limits are not exceeded.

The circuitry for control of the laser emission may also be implemented for triggerless operation. The laser is operated in a pulsed manner during a find paper mode until a reflected signal is obtained, at which time the mode is changed to the search mode. The circuitry will remain in the search mode for a fixed period of time, e.g. one second or until the first black bar is detected at which time the mode changes to an in-code mode as long as successive symbols are received by the photodetector means within a given period of time. At the termination of the in-code mode the circuitry returns to the find paper mode. The in-code mode is timed so that if it ends within a fixed interval, e.g. one second after the beginning of the search mode, the search mode is re-entered, otherwise the in-code mode will change to the find paper mode. Specifically a pulse generator may be used which generates pulses having a duty cycle such that the laser cannot be turned on during the find paper mode for a period which would exceed the safety limits. The laser emission may be controlled during the find paper, search, and in-code modes with means that respond to the time that the laser enabling signal is on and be operative to inhibit the laser from being turned on for longer than a certain period of time during any running period of time which would allow the Class I radiation limits to be exceeded.

The foregoing and other objects, features and advantages of the invention as well as presently preferred embodiments thereof will become more apparent from a reading of the following description in connection with the accompanying drawings in which.

Figure 2:
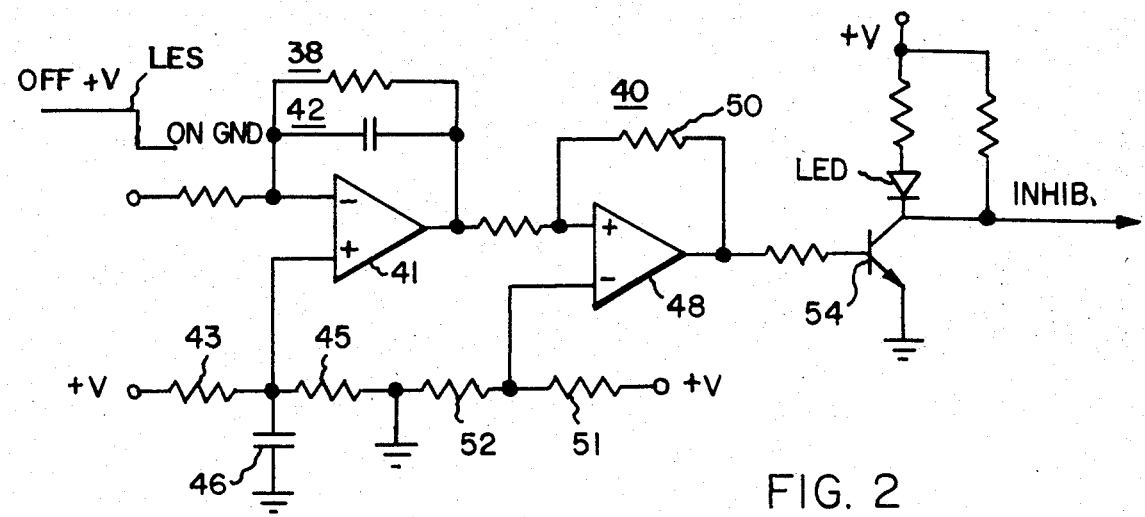
FIG. 2 is a schematic diagram of the dual slope integrator and comparator used in the system shown in FIG. 1.
Figure 5:
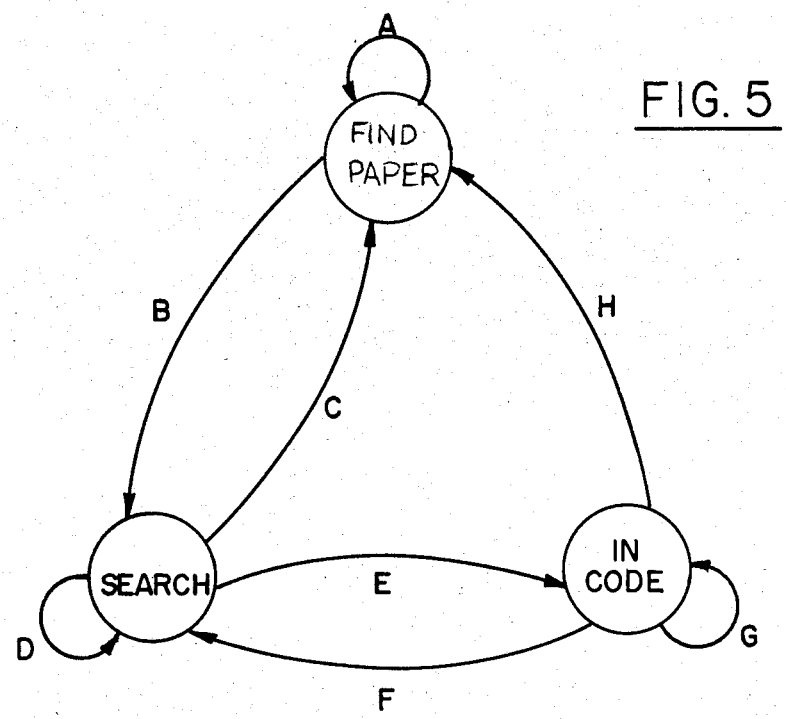
FIG. 5 is a state diagram describing the operation of the system of FIG. 3 and FIG. 4.
Figure 3:
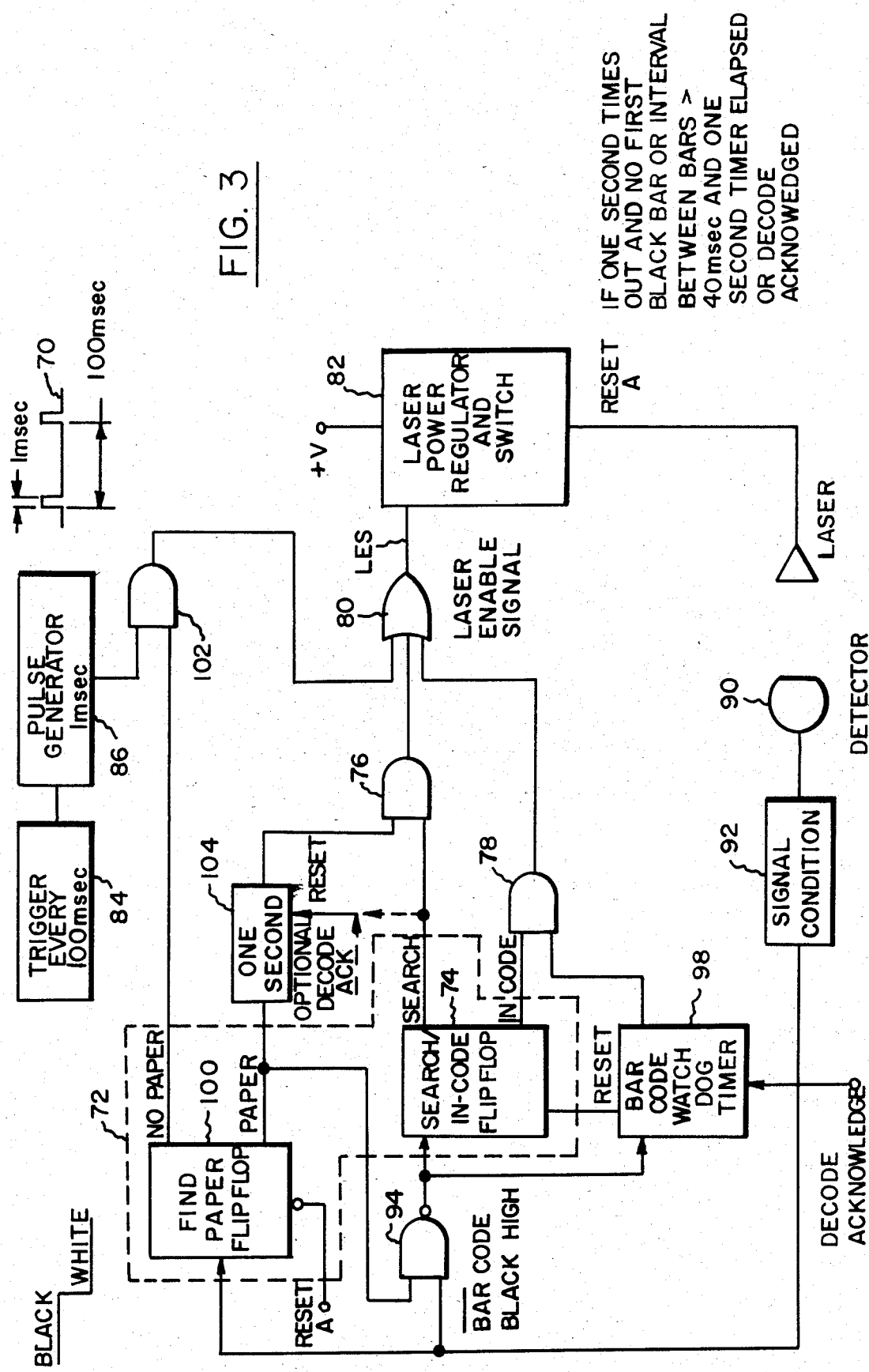
FIG. 3 is a block diagram illustrating the controller of a laser scanner in accordance with another embodiment of the invention.
Figure 4:
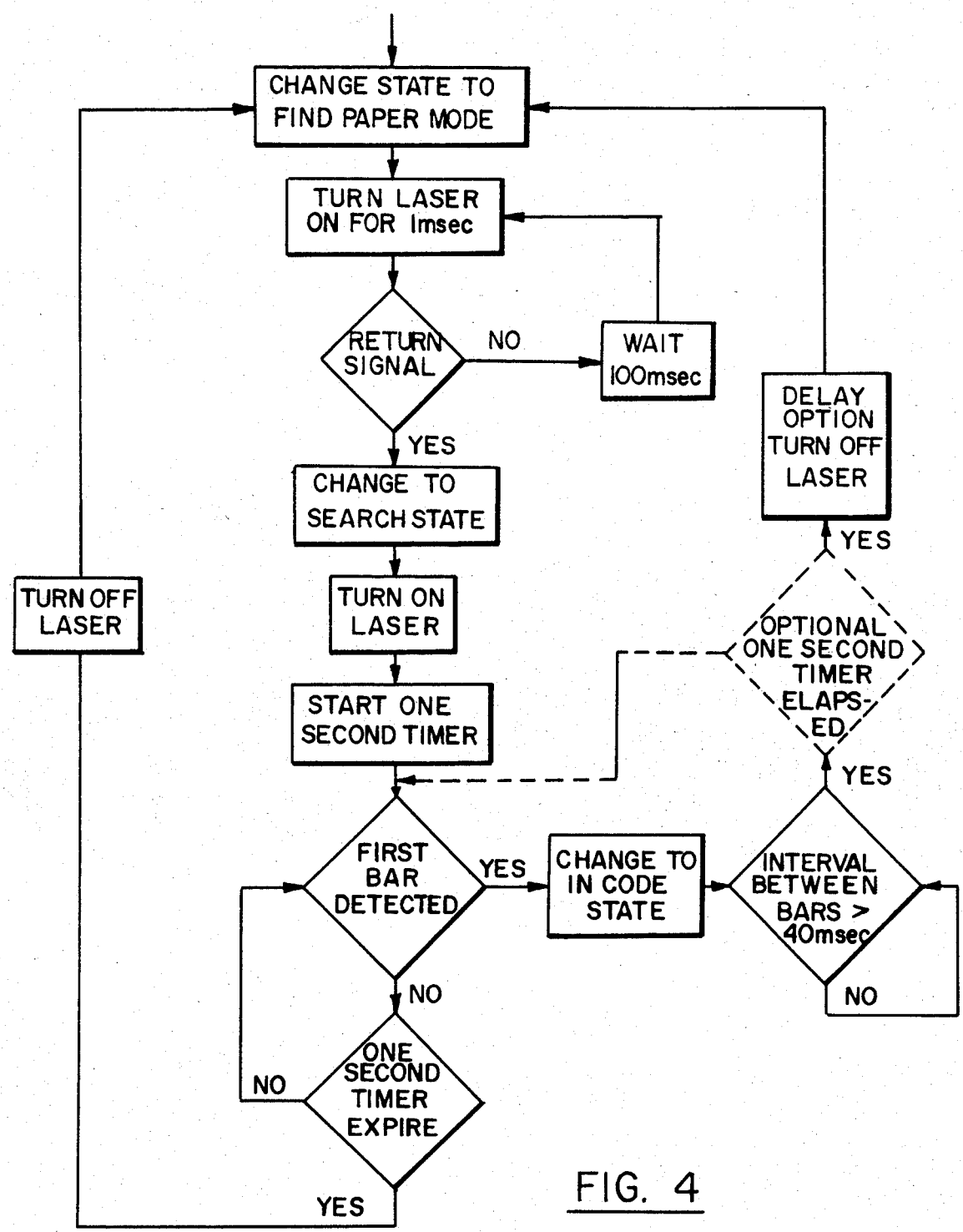
FIG. 4 is a flow chart illustrating the operation of the system shown in FIG. 3.

The principle upon which this invention is based, both as regards the embodiment described in connection with FIGS. 1 and 2, and the embodiment which is described in connection with FIGS. 3, 4 and 5, is to enable the laser of the scanner to be on for brief periods of time during the find paper mode and to simultaneously watch for a return signal from the photodetector of the scanner. If a return signal is detected it is assumed that the scanner is pointed at the surface on which the bar code is printed. Detection of the return signal enables the laser to be turned on for a brief period of time in the search mode. During this period, the return signal is monitored for further signal transitions corresponding to the bars of the code. On detection of the first black bar the mode is changed to the in-code mode. The preferred embodiments of the invention are incorporated in a scanner using a relatively low power, laser diode which is turned on when operating voltage is applied and shuts off when the operating voltage is removed. The scanner in the preferred embodiment is a hand held scanner which may be held like a gun and manually scanned across the code. The invention may be used, however, in scanners which utilize other forms of lasers or when the scanning is carried out by rotating or nutating mirrors, electro-optical scanners, diffraction devices, and the like.

Figure 1:
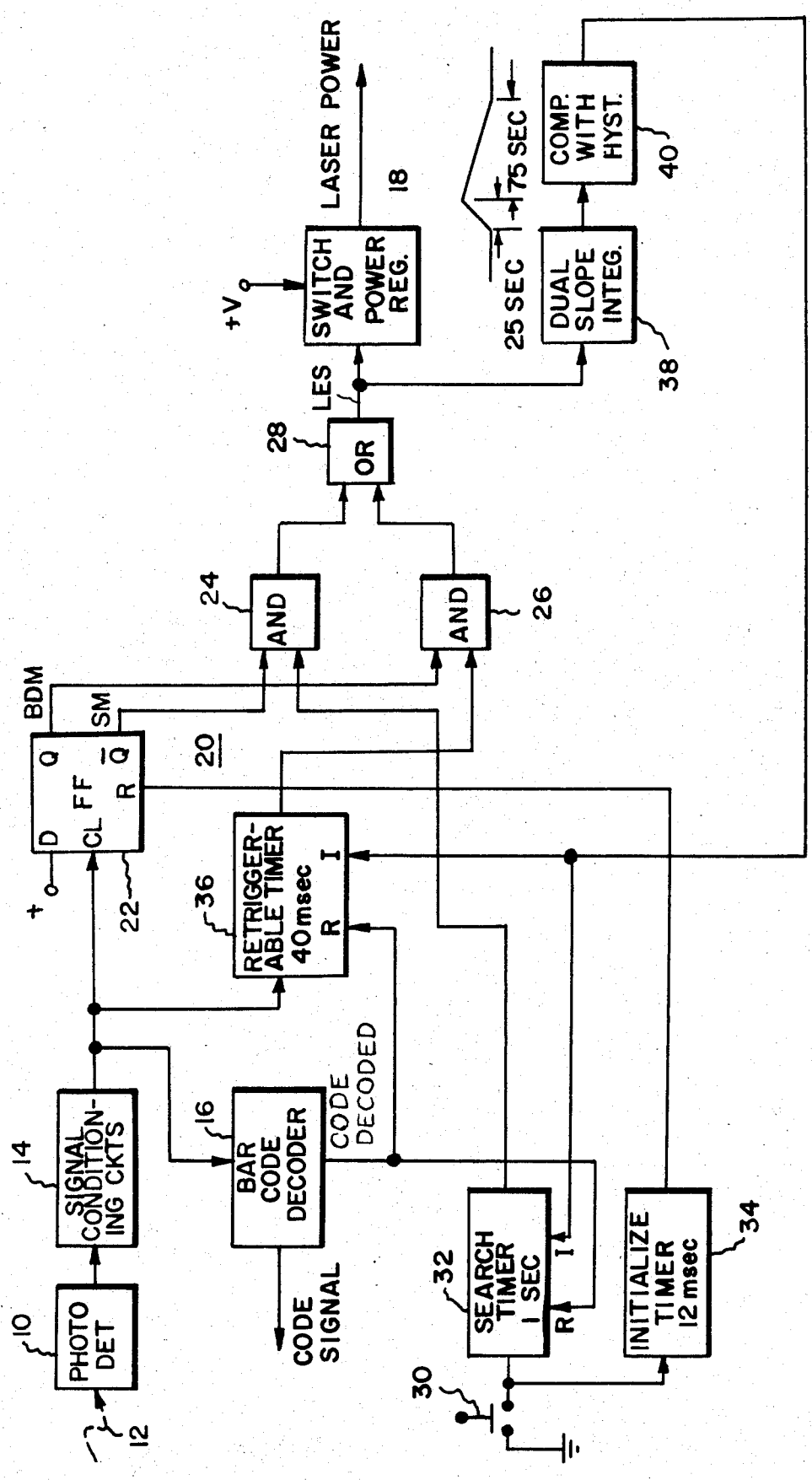
FIG. 1 is a block diagram illustrating the system for controlling a laser of a code symbol scanner so as to provide for Class I operation of the scanner.

In the embodiment of the invention illustrated in FIGS. 1 and 2, the maximum period of time that the laser can be on, either during the in-code or search mode, is controlled so that the Class I emission limits cannot be exceeded. These emission limits for low power lasers which can be on from 10 to 10,000 seconds has been set by the Radiological Health Authorities by an equation. This equation is $3.9 \times 10^{-3} K_1 K_2$. This equation gives the emission in Joules of energy where $K_1$ is $10^{L-700/515}$. L is the wavelength of the laser light. A typical laser diode produces monochromatic light at a wavelength of 830 nanometers. $K_1$ is therefore 1.78825. $K_2$ is 1 if the laser is not on for 100 seconds or more. If the laser is on over 100 seconds, $K_2$ is equal to t/100. Therefore, so long as the laser is not on for a period of time when it emits 6.97 milliJoules, which is less than 100 seconds, the Class I limits are achieved.

The embodiment of the invention illustrated in FIGS. 1 and 2 operates by indirectly measuring the laser emission by integrating or accumulating the signal which turns the laser on and off. The rate at which the signal accumulates and the threshold of the accumulation emulates the emission. It assures that in any 100-second period the laser can be on for no more than 25 seconds. This is a running 100-second period. By setting the threshold in accordance with the equation given above, in the worst case condition the laser cannot be on for more than 25 seconds in any running 100-second period.

In the implementation of this embodiment of the invention, as shown in FIGS. 1 and 2, the photodetector 10 of the scanner responds to reflected light 12 from the bar code being scanned. The signals from the photodetector are conditioned and converted into square waves by signal conditioning circuits 14. A bar code decoder 16 translates the signals into a code signal which goes to the computer or other device which utilizes the bar codes. The decoder 16 also outputs a code detected signal when a complete code is detected. The scanner has a laser not shown to which power is applied by a switch and power regulator 18 from a source of power indicated as +V, such as a battery. The switch and power regulator are operated by a laser enabling signal (LES) which is generated by a mode controller 20. This mode controller includes a D-type flip-flop 22 and gating logic illustrated as two AND gates, 24 and 26 and an OR gate 28. It will be appreciated, as the description proceeds, that while hard wired logic may be used in the mode controller, the system may be implemented by suitably programming a microprocessor.

A bar code detection cycle is initiated by depressing a switch 30. The switch starts a search timer 32 and a timer 34 which initializes the system. The timer 34 outputs a 12 millisecond pulse which resets the flip-flop 22. The search timer has been reset when the previous code is detected or the trigger has been released. A search time of 1 second is therefore initiated when the output of the timer 32 enables the AND gate 24 in the search mode channel of the controller. The search mode occurs because the flip-flop is reset thereby enabling the AND gate 24 from the not-Q output of the flip-flop 22. The laser power is turned on for 1 second, since the mode controller outputs a laser enabling signal to the switch and power regulator 18 via the OR gate 28. If no return signal is detected within the 1 second period, the mode controller will not output a laser enabling signal and the system must wait until the switch 30 is again actuated.

When a return signal is detected, and a transition indicating the presence of a bar is indicated by the output of the signal conditioning circuits 14, the flip-flop 22 is clocked. The flip-flop then assumes its set state and the system switches to the in-code or code acquired mode. A retriggerable timer 36 having a 40 millisecond on time (40 milliseconds being the maximum transition time considering a minimum scanning rate and bars of maximum width) causes the in-code state to persist for 40 milliseconds, since the AND gate 26 is then enabled by the Q output of the flip-flop 22 and the retriggerable timer 36. If another transition is not detected within the 40 milliseconds, the retriggerable timer times out and laser power is switched off. The switch 30 must be manually actuated to start another cycle. Assuming that the scan remains in-code, the laser remains on until the bar code is decoded. The bar code decoded output of the bar code reader then resets the retriggerable timer 36 and also the search timer 32, and the laser is switched off.

The laser enabling signal from the output of the OR gate 28 also goes to a dual-slope integrator circuit 38. The dual-slope circuit provides a ramp signal which ramps up at a greater rate, while the laser enabling signal is on, than the rate at which it ramps down, while the laser enabling signal is off. This rate is selected so as to emulate the emission from the laser. The maximum emission is determined by a comparator circuit 40. The maximum or threshold of the comparator 40 corresponds to the maximum emission limits dictated by the above-discussed equation. In a worst case, the laser can be on for 25 seconds, with the ramp signal increasing at maximum rate, before the threshold is reached. When the threshold is reached, the comparator outputs an inhibit signal which immediately inhibits the retriggerable timer 36 and the search timer 32. These circuits cannot be retriggered for the time it takes the ramp signal to ramp down to the initial level. Because of the difference in rates of the ramp on and ramp down signals, in the worst case, the laser can be on for no more than 25 seconds in any one 100-second interval. Therefore, the $K_2$ limits of the equation given above cannot be exceeded and the threshold corresponds to the maximum emission level.

The comparator 40 has hysteresis such that the signal must ramp down to the initial level before the inhibit signal is terminated. The function of the dual slope integrator and comparator may also be implemented with digital circuitry, as in a microprocessor, programmed to carry out an accumulating and threshold detection function. Accumulation in one sense can occur at a greater rate than in the opposite sense in order to obtain the dual slope characteristics and the on and off time relationships which are obtained with the dual slope integrator 38 and comparator 40.

FIG. 2 illustrates suitable circuitry for implementing the dual slope integrator 38 and the comparator 40. The laser enabling signal (LES) is applied to one input of an operational amplifier 41 which is connected as an integrator through the use of an RC feedback circuit 42. The reference level on the direct input of the operational amplifier 41 is established by a voltage divider including two resistors 43 and 45. A capacitor 46 limits any fluctuations in the reference level. When the LES signal is high, indicating that the laser is off, the difference voltage across the input resistance of the operational amplifier is such that the capacitor in the feedback circuit 42 discharges at one rate. When the LES signal is low, the difference voltage across the input resistance is such that the capacitor 42 charges at a greater rate. Accordingly, the ramp signal increases at a greater rate than it decreases. This ramp signal is applied to the comparator 40 which is implemented by another operational amplifier 48. A feedback resistor 50 provides hysteresis, such that the comparator once switched on when the signal to its direct input exceeds the threshold established by a voltage divider including a pair of resistors 51 and 52 is exceeded, the output of the comprator stays on until the ramp signal applied to its direct input decreases all the way back to ground level.

The inhibit signal is amplified by a transistor amplifier 54 and applied to the retriggerable timer 36 and search timer 32. An LED (light emitting diode) may be used in the transistor amplifier circuit to indicate that the inhibit signal is on and the scanner is inactive.

The embodiment of the invention shown in FIGS. 3, 4 and 5 has the advantage of not requiring a actuating (trigger) switch. The Class I emission limits are not exceeded since the find paper mode, which can go on continuously is carried out as a pulse mode with a duty cycle too low to exceed the Class I limits. The laser emission may be controlled during the find paper, search, and in-code modes with the same dual slope integrator as previously described.

The timing of the pulses in the find paper mode is selected to give the operator a rapid response when the scanner is pointed at paper, e.g. 100 ms sampling rate. The length of the pulse is selected to stay well below the Class I limit, e.g. 1 millisecond (ms) pulse length. This produces an average accumulated emission which is 4% of the Class I limit. Accordingly, during the find paper mode, the pulse controller puts out an enabling signal of 1 millisecond duration pulses separated by 100 milliseconds. This pulse train or repetitive pulse signal is illustrated at 70 in FIG. 3.

FIG. 3 also shows a mode controller 72 having a find paper flip flop 100 and a search/in-code flip-flop 74 similar to the flip-flop 22 in the mode controller 20 (FIG. 1). The mode controller also has AND gates 102, 76 and 78 which transfer the laser enabling signal during the find paper, search, and in-code modes, respectively. An OR gate 80 outputs the laser enabling signal (LES) to the power switch and regulator 82.

A pulse generator 84 (e.g., a clock oscillator) outputs a trigger every 100 milliseconds to a timer 86 which produces an 1 millisecond pulse every 100 milliseconds as shown in the waveform 70. This pulse is utilized as the LES during the find paper mode. Initially, the flip-flop 100 is reset and enables the AND gate 102 during the find paper mode. Accordingly, the pulse train 70 is applied, as the LES, to the laser power switch and regulator 82.

The bar code detector photodiode 90 and its signal conditioning circuits 92 apply the bar code signal to the AND gate 94 and the find paper flip-flop. Accordingly, during the time the laser is on, as indicated by the presence of the 1 millisecond pulse, a valid return signal can occur and set the flip-flop 100. This begins the search mode in which the operator has one second to move the scanner over the first black bar. The change from the find paper mode to the search mode also starts a one second timer 104. In addition, the AND gate 94 is enabled so that the first transition of the "bar code black high" signal will change the state of the flip-flop 74 from the search mode to the in-code mode and the 40 millisecond bar code watchdog timer 98 will be started. This timer operates in the same manner as the retriggerable timer 36 so as to maintain the in-code mode only if the transitions appear in sequence and with timing characteristic of the detection of the bar code.

The find paper flip-flop 100 is reset if the one second timer 104 times out and no first black bar has been detected, or the one second time 104 has not expired but the watchdog timer 98 has timed out, or an acknowledge signal from the bar code decoder indicates the successful decoding of a bar code.

The one second timer is reset optionally from the transition of the search/in-code flip-flop 74 changing to the search mode or an acknowledge signal from the decoder. This option is dependent on the decoder having an acknowledge signal. If the decoder does not have this signal then the reset of the search/in-code flip-flop 74 must be used to reset the one second timer 104. This option is also shown on the flow chart FIG. 4 as a dotted box.

The search/in-code flip-flop 74 is reset to the search mode at the timeout of the bar code watchdog timer 98. The watchdog timer 98 may also be reset by an acknowledge signal from the decoder.

The operation of the system will also be self-evident from the flow chart illustrated in FIG. 4 and state diagram of FIG. 5. The functions of the system as illustrated by the flow chart in FIG. 4 may be implemented by software in a microprocessor as well as in the hard wired implementation shown in FIG. 3.

From the foregoing description it will be apparent that there has been provided an improved system for obtaining laser safety in code symbol scanners. The system operates electronically and without special shutters, protective housings, alarms or other mechanisms to achieve these safety standards. This system has been illustrated in two embodiments herein; however, variations and modifications in the hereindescribed embodiments of the system, within the scope of the invention, will undoubtedly suggest themselves to those skilled in the art. Accordingly, the foregoing description should be taken as illustrative and not in a limiting sense.

We claim:

1. In a code symbol scanner apparatus having a laser normally operable at a power output above radiation safety limits and photodetector means for deriving signals from said code symbols, the improvement which comprises mode control means for providing a first mode of operation of said apparatus during which a search is carried out for said code symbols and a second mode of operation after said symbols are detected and while scanning of said symbols is carried out, means for operating said mode control means for initiating said second mode upon detection of a first of said symbols, means for discontinuing said second mode unless signals corresponding to successive ones of said symbols are derived by said photodetector means within a given period of time, means operated by said mode control means for turning on said laser during said first and second modes at said power output above said limits, and means for further controlling said mode control means for controlling the time said laser is turned on so that the radiation safety limits are not exceeded.

2. The improvement according to claim 1 wherein said further controlling means comprises means operative during the time said mode control means turns said laser on for inhibiting said mode control means from turning said laser on for a first given period of time such that said laser cannot be turned on for longer than a certain period of time during any running period of time of length equal to said certain period and the period that said laser is on.

3. The improvement according to claim 2 wherein said further controlling means comprises means for accumulating a signal which changes in amplitude in one of two opposite senses when said mode control means turns said laser on and changes in amplitude in the opposite sense when the laser is turned off by said mode control means, and means for detecting when said signal amplitude exceeds a limit in said one sense for inhibiting said mode control means for said first given period of time.

4. The improvement according to claim 3 wherein said accumulating means is a dual slope integrator responsive to said mode control means which provides a ramp signal which increases when said mode control means turns said laser on and decreases when said mode control means turns said laser off, and said detecting means comprises a comparator having means for providing an inhibiting signal to said mode control means when said ramp signal exceeds a predetermined limit and until said ramp signal decreases to below a certain level to provide said inhibiting signal for said first given period of time.

5. The improvement according to claim 3 wherein said accumulator means includes means for enabling said signal to change in said first sense while said laser is turned on at a greater rate than in said opposite sense while said laser is turned off.

6. The improvement according to claim 4 wherein said dual slope integrator includes means for increasing and decreasing said ramp signal at faster and slower rates, respectively.

7. The improvement according to claim 1 wherein said first mode is a "find paper" mode, and said means for further controlling said mode control means comprises means for providing intermittent operation of said mode control means during said "find paper" mode at a duty cycle such that said safety limit is not exceeded.

8. The improvement according to claim 7 wherein said mode control means comprises means for generating a laser control signal for enabling said laser to be turned on and off, and said means for providing intermittent operation comprises pulse generator means for generating pulses intermittently with said duty cycle, and said mode control means comprises means for providing said pulses as said laser control signal during said find paper mode.

9. The improvement according to claim 1 wherein said mode control means comprises a flip-flop for establishing said search mode and said symbols detected mode when in a first and second states, respectively, a first gate providing an AND function and a second gate also providing an AND function, means for connecting said flip-flop to said first gate for enabling said first gate when said flip-flop is in said first state and said second gate when said flip-flop is in second state, a third gate providing an OR function connected to the outputs of said first and second gates, said third gate providing a signal for enabling said laser to be turned on and off, means for applying an enabling signal to said first gate, and means responsive said photodetector means for applying an enabling signal to said second gate through said discontinuing means upon detection of a first of said code symbols and for switching said flip-flop to said second state.

* * * * *